April 15, 1952  K. W. FISHER ET AL  2,592,882
REFLEX LIGHT REFLECTOR
Filed Dec. 4, 1946
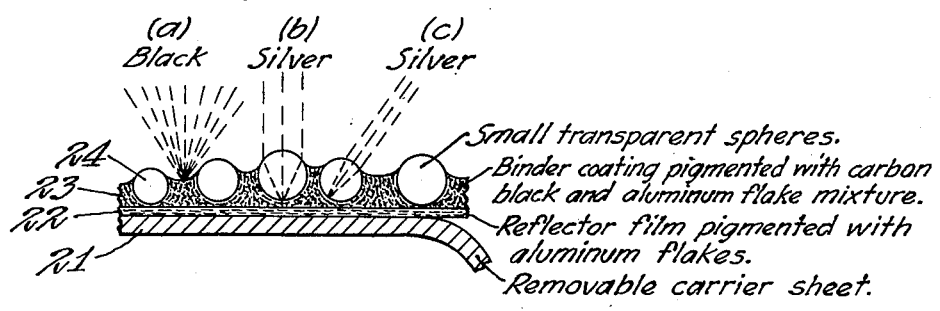
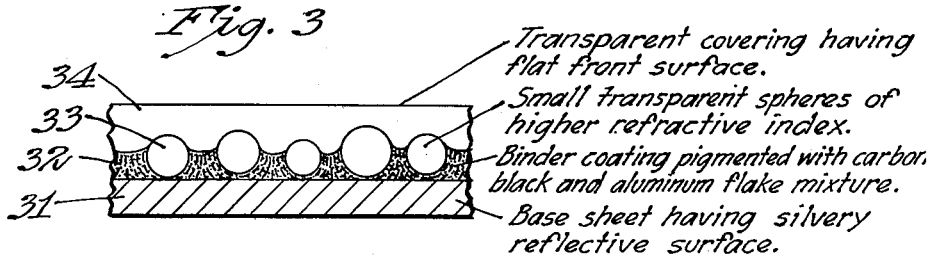
Inventors
Kenneth W. Fisher
Harry Heltzer
By Carpenter, Abbott, Coulter & Kinney
Attorneys Patented Apr. 15, 1952

2,592,882

UNITED STATES PATENT OFFICE 2,592,882

REFLEX LIGHT REFLECTOR

Kenneth W. Fisher and Harry Heltzer, St. Paul, Minn., assignors to Minnesota Mining & Manufacturing Company, St. Paul, Minn., a corporation of Delaware Application December 4, 1946, Serial No. 714,116

2 Claims. (Cl. 88—82)

This invention relates to reflex light reflectors of the class in which a light-returning layer of small transparent spheres is associated with light-reflecting means underlying the spheres; forming a catadioptric combination. A beam of light incident on the front of the sphere layer is refracted and reflected in such manner that a brilliant cone of light is selectively returned toward the light source, even though the incident beam strikes at an angle. Road signs and markers of the reflex type have greater visibility at night than do ordinary signs and markers, to the occupants of an approaching vehicle, since less of the reflected light is dissipated outside of the field of viewing; the reflected light being concentrated in a narrow cone which automatically returns toward the headlights and occupants of the vehicle.

The present invention provides a reflector which appears black when viewed by daylight and yet has a brilliant silvery appearance when viewed at night under reflex-reflecting conditions. A feature of the structure is that excellent high brilliancy wide angularity properties can be secured, by which it is meant that the reflector maintains a high brilliancy even when the incident beam of light strikes the sphere layer at a large angle from the perpendicular (normal), as viewed by persons near the axis of the incident beam.

The reflector material can be fabricated in flexible, weatherproof, sheet form adapted for applying to desired bases in the making of highway signs and markers. The structure can also be built up by applying suitable coatings directly to a stiff base.

The invention is based upon the discovery of the peculiar and unexpected reflection characteristics produced by a layer of small transparent spheres partially embedded in a binder layer composed of a transparent binder material pigmented with a mixture of carbon black and aluminum flakes.

The invention can best be described in connection with the accompanying illustrative diagrammatic drawings, wherein:

Fig. 1 shows in diagram form a reflex reflector and the concentrated cone of reflex-reflected light returning toward the source of an angularly incident ray or beam which produces it.

Figs. 2 and 3 are highly magnified diagram views showing the sectional structures of two different reflex reflectors embodying the invention.

Fig. 1 makes plain the difference between a reflex reflector sheet 10 and other types of reflector surfaces. In the case of mirrors, which cause specular reflection, an angularly incident ray is reflected back at an equal angle but on the other side of the normal, and hence does not return to the source. In the case of a reflective diffusing surface, the reflected light is spread out in all directions and only a small fraction returns toward the source. But an efficient reflex reflector returns the reflected light toward the source in a concentrated cone even though the incident light strikes at an angle, as is illustrated in the diagram.

Fig. 2 shows an illustrative reflex reflector film structure which is self-sustaining but is temporarily attached to a removable carrier sheet 21 upon which the coatings are built up, and which can be peeled off when desired. The film structure consists of a flexible back reflector film 22 coated upon the carrier sheet. This film is pigmented with aluminum pigment flakes which tend to lie flat at the surface, and provides a semi-specular silvery reflective surface. Upon this is coated and bonded a pigmented binder layer 23 in which is partially embedded a single surface layer of small transparent spheres 24, which have been pressed in while the binder coating was still in a plastic condition (before curing or drying), so that the back extremities touch or closely approach the underlying reflector film 22. This pigmented layer, upon setting-up, firmly holds the spheres in position and contacts the rearward surfaces thereof. In the drawing, the spheres are shown farther apart than is customarily the case.

The binder coating composition is comprised of a transparent body material (such as a lacquer or varnish material) containing a mixture of carbon black and aluminum flake pigments. The entry of each sphere into this layer, during the making operation, tends to orient the nearby aluminum flakes so that they face toward the surface of the sphere, providing silvery reflective surfaces about and in close proximity to the embedded sphere surface, although the binder mass appears to be black and non-reflective. The carbon black particles, which are of colloidal size, are minutely small compared to the aluminum flakes. Some of these black particles will lie scattered between the flakes and the sphere surface, but these will not prevent efficient reflection. It has been discovered that the proportions of the two pigments can each be sufficient, and in suitable relation to each other, to produce the paradoxical optical result desired, which will now be described in more detail.

Referring to Fig. 2, the light rays (a) represent incident rays approaching an outer surface portion of the binder coating lying between exposed surfaces of adjacent spheres. These rays approach from different directions in the case of a vertical sign viewed by daylight, as indicated. The binder surface has a black appearance owing to the carbon black pigment content, which means that the incident rays are largely absorbed by the binder surface, notwithstanding the presence of the highly reflective aluminum flake pigment in the binder. For the same reason, a beam of incident paraxial rays is likewise absorbed so as to produce a black appearance.

The paraxial rays (b) are shown striking the outer exposed face of a particular sphere, approaching normally (perpendicularly) to the plane of the reflector sheet. These rays are refracted at the surface and converge toward the central axis. Owing to spherical and chromatic abberation effects, they cannot be brought to a true focus, but they can be brought together so as to strike the rear surface of the sphere within a small area zone, which will be smallest (and thus most closely approach to a focal "point") when the refractive index of the sphere is approximately 1.85–1.90. Reflection of the rays at the back surface of the sphere results in a cone of returning divergent reflected rays, which are refracted at the front surface of the sphere so as to be concentrated in a narrow cone having substantially the same axis as the incident rays. The divergency of the rays returning toward the source is least when the refractive index of the sphere is approximately 1.85–1.90. Owing to the small size of the spheres, there being thousands per square inch, the eye of an observer cannot distinguish the rays from each individual sphere.

The paraxial rays (c) are shown striking the outer surface of an exposed sphere at a substantial angle to the normal. Refraction occurs so as to converge the rays about a point on the side under-surface of the sphere, and refraction at the sphere surface results in a cone of reflected light returning toward the source. This accounts for the "reflex" reflection characteristic, previously mentioned.

In the present structure, reflection of all rays penetrating a sphere does not occur at the precise surface of the sphere, since the aluminum flakes do not form a continuous reflective surface in direct contact with the surface of the sphere. Rays may penetrate a short distance into the binder material before being reflected. It might be predicted that the presence of carbon black particles would cause so much absorption of light as to prevent efficient reflection, thus precluding brilliant reflex reflection, unless the proportion of carbon black in the binder composition is so low as would preclude a black outer surface appearance. However, contrary to such an expectation, it has been discovered that the carbon black and aluminum flake pigments can be correlated in their proportons so as to produce the paradoxical result of a binder coating which is non-reflective (black) in respect to rays striking its outer surface, and yet is an efficient reflector in respect to rays striking the interior surfaces facing the interior surfaces of the spheres.

In the Fig. 2 structure, the reflector film 22 is employed both as a support (imparting strength to the reflector sheet), and to provide a reflective surface underlying the back extremities of the spheres. Since the spheres penetrate the binder coating in the making process, they touch or closely approach the reflector film, and efficient reflection of normally incident rays is improved by providing a film having a reflective surface. However, the binder coating can be used upon a non-reflective support by employing a thicker coating and applying the spheres in such manner that the back extremities are covered by an adequate thickness of binder composition to provide efficient reflection.

The reason why the day appearance of the reflector sheet is black, and yet the night reflex reflection appearance is a brilliant silvery color, as in the case of a highway sign viewed by approaching motorists, is as follows: The large number of small spheres per square inch prevents the observer's eyes from resolving the spheres and interposed surface areas of the binder coating. The surface appears to be continuous and uniform. When the sheet is viewed by diffused daylight, only a small proportion of these rays which impinge on the spheres are going in the right direction to be reflexively reflected at the back surfaces of the spheres so as to reach the observer's eyes (i. e. only those rays which are incident in paths close to the observer's line of sight). The incident light rays striking the outer exposed surfaces of the binder coating are largely absorbed, producing a continuous black appearance, which is not overcome by the small amount of "silvery" light reaching the observer's eyes. The latter causes a graying of the black, but the net result is still a definite black appearance. The surface appears as though continuously coated with black paint. But when viewed under night reflex reflection conditions (as by the occupant of an approaching automobile whose headlights illuminate the reflector sheet), the illuminating rays are incident in substantially the same direction as the observer's line of sight, and a brilliant silvery reflection occurs for those rays striking the spheres. The intensity is so great as to "drown out" the black effect of the exposed binder surface areas. The surface appears as though continuously coated with a brilliant silvery paint. Thus the difference in day and night appearances results from optical illusion effects produced by the structure described.

This effect appears "magical" to the uninitiated and makes possible advertising signs of striking novelty. For example, upon a sign area which is painted black in the ordinary way, there may be affixed letters, symbols or designs cut from the present type of reflex reflector sheeting. By day, the entire area appears black. By night, the letters, symbols or designs stand out as brilliant silvery areas visible at a great distance. A similar result is obtained by using a sheet of the present type and blacking out certain areas, by painting or printing over the sheet with black paint or ink. The covered portions will continue to be black at night but the uncovered portions will be a brilliant silvery color.

An example of a safety marker use, is to affix strips of the reflector sheet to front and back body surfaces of a motor vehicle having a black body. The strips will be inconspicuous by day, but by night will be brilliantly visible to approaching motorists and warn of the vehicle's presence, even though its own lights are off.

It will be evident that numerous expedients can be employed in making signs and markers and no attempt will be made to describe all of the possibilities, which are merely illustrated by the foregoing examples. Signs and markers are to be considered as "reflex reflectors" even though only portions of the total areas have the structure herein described.

The preferred size of the spheres is an average diameter not exceeding 10 mils (0.010 inch). A convenient average diameter is approximately 5 to 6 mils, although smaller spheres can be used; which results in upwards of 10,000 spheres per square inch when they are coated in normal close-packed fashion. Glass sphericules of this kind are commonly referred to as "glass beads."

Transparent colored beads can be used instead of the uncolored normal beads, in which case a corresponding colored reflex reflection will result in place of the previously described silvery reflection (owing to the color filter action of the beads). Thus transparent red beads can be used to produce a reflector sheet which appears black by day but which by night appears as though covered by a brilliant red paint.

Maximum reflex-reflection brilliancy is obtained when the refractive index of the spheres is approximately 1.80–1.90. However, a high degree of brilliancy is obtained in the range of 1.7–2.0. Ordinary glass beads (refractive index approximately 1.50–1.55) result in a vastly lower efficiency than the optimum.

An illustrative type of binder composition having an effective correlation of pigment proportions is one containing about 4 parts of carbon black and about 16 parts of aluminum flake powder per 100 parts of total dry weight (exclusive of any volatile solvents or thinners), the remainder being the transparent varnish or lacquer solids. Thus on a weight basis, the carbon black is in lesser proportion than the aluminum pigment. In general, it is found that good results are obtained with a ratio of aluminum pigment to carbon black in the range of about 2:1 to 4:1, by weight; the proportion of carbon black being about 2–5 parts per 100 parts total.

It will be understood that the invention embraces equivalent materials. Thus the reflective metallic flake pigment need not be of aluminum. Instead of carbon black, use can be made of other finely divided pigments of a dark (highly light absorptive) nature, which need not be actually black; as contrasted to transparent pigments and to highly reflective pigments. The transparent spheres need not be made of inorganic glass, but may be made of transparent organic resin "glass."

Referring to Fig. 3, a different species of the invention is illustrated. In this case the structure has a base or sheet 31 having a silvery reflective surface (such as an aluminum or tin foil, or a chromium plated steel sheet), upon which is united a binder coating 32 pigmented in the manner previously described, in which is partially embedded a single layer of small transparent spheres 33. The physical structure thus far is similar to that of Fig. 2. However, in this case there is a further coating of transparent material which provides a transparent covering 34, having a flat front face. This covering seals in the front portions of the spheres and the front surface of the binder coating.

If the transparent covering layer and transparent spheres had substantially the same refractive indices, proper refraction would not occur at the front surfaces of the spheres. The spheres must have a refractive index substantially higher than that of the covering layer. The refractive index ratio should preferably be in the range of about 1.6–2.0, the optimum ratio being approximately 1.9. For a further description of certain optical principles involved in this type of structure, wherein the spheres are covered, see the Palmquist, Cross and Netherly Patent No. 2,407,680, issued September 17, 1946.

In respect to this Fig. 3 species of construction, the effective refractive index of the spheres is the ratio of the absolute refractive index of the spheres to the refractive index of the transparent covering layer; whereas in the Fig. 2 species the effective refractive index of the spheres is the ratio of the absolute refractive index of the spheres to the refractive index of the covering air (the latter being unity). It will be understood that in the claims the refractive index of the spheres refers to the effective refractive index of the spheres in any given construction.

*Example*

This example illustrates the making of weatherproof, flexible reflex reflector sheeting of the general type shown in Fig. 2, adapted to be manufactured in continuous web form and to be supplied in rolls, which may be readily cut into sheets or shapes of desired configuration for affixing to base surfaces in the making of signs and markers. The reflector sheet is built up by a casting technique upon a coated paper carrier sheet which can be removed and reused, or can be left in place as a removable liner which can be stripped off dry whenever desired (as distinguished from liners which must be moistened to be readily removed).

The carrier web is prepared from a highly calendered hard-surfaced paper (such as a 70 lb. per ream Fourdrinier paper) which is knife-coated with a sizing solution (42% by weight of polystyrene dissolved in 58% of xylol solvent) in the amount of about 5–7.5 grains per 24 sq. in. (wet weight), followed by drying (15 minutes at 140° F. is suitable). This coating adheres tenaciously to the paper and provides a smooth surface for the subsequent coating operations.

The dried paper is then knife-coated with a strip coat solution (10% by weight of polyvinyl butyral dissolved in 90% of ethylene glycol monoethylether solvent, commonly known as "Ethyl Cellosolve") in the amount of about 18–24 grains per 24 sq. in. (wet weight) followed by drying (30 minutes at 140° F. is suitable). This provides a back sizing which bonds to the reflector film and facilitates dry-stripping from the paper carrier web, owing to low adhesion of the back sizing (strip coat) to the sized surface of the paper.

Upon the dried strip coat is knife-coated a reflector film composition comprised of 90 parts by weight of an oil-modified air-drying phenolic resin base varnish (containing driers), and 10 parts of aluminum flake pigment (such as No. 30XD aluminum powder sold by Reynolds Metal Co.), the wet coating weight being about 7–9 grains per 24 sq. in. This coating is cured for 60 minutes at 180° F. and provides a reflector film firmly bonded to the strip coat, the latter forming a back size coating which is extremely thin (the dry weight being about 2 grains per 24 sq. in.).

Upon the reflector film is knife-coated a bead binder composition having the following composition:

| | Parts by weight, per cent |
|---|---|
| Transparent body and solvent (consisting of two-thirds "Beetle No. 227–8" and one-third heavy blown castor oil, by weight) | 92 |
| Aluminum flake pigment (such as No. 40 XD aluminum powder sold by Reynolds Metal Co.) | 6 |
| Carbon black pigment | 2 |

The "Bettle No. 227–8" is a 50% solution of thermosetting ureaformaldehyde resin in a volatile solvent composed of 60 parts butyl alcohol and 40 parts xylol, sold by American Cyanamid Co. The blown castor oil serves as a non-volatile plasticizer. Ethyl Cellosolve can be added as a thinner if desired, to decrease the coating viscosity. This composition makes for a binder coating layer which is flexible and stretchy (as is the underlying reflector film), and it is weatherproof and non-darkening (i. e. the transparent body phase is not darkened by sunlight). It firmly bonds to glass beads embedded therein.

With the binder coating still in a wet or undried state, glass beads of No. 11 size (average diameter of about 5–6 mils) are applied in excess to the horizontally moving wet surface of the web, the beads sinking down in the wet coating until they touch, or closely approach, the surface of the underlying reflector film. Positioning of the beads can be facilitated by passing the web over a batter. The web may then be passed down around a roller to cause excess beads to fall off. A suitable coating weight for the above-mentioned binder composition, when No. 11 beads are used, is about 12–14 grains per 24 sq. in. (wet weight).

The web, with its applied coatings, is then festooned on racks and oven cured to set-up the bead binder coating. A suitable curing cycle is about 120 minutes at 210° F. (another example is 25 minutes at 140° F. and 100 minutes at 199° F.). Any surplus beads adhering to the surface can be removed by passing the web around a roller and subjecting the beaded surface to the action of a rotary brush and air blast. The embedded beads form a single layer wherein each bead is normally contacted by the binder to somewhat above its middle, providing a mechanical socketing to increase firmness of anchorage.

The reflector sheet can be stripped from the paper carrier web and the latter can be reused, the reflector sheet being fully self-sustaining.

The reflector sheet, made as described, is stretchable and is well adapted to being conformed to irregular base surfaces, such as those of embossed signs. The reflector sheet of this example is of the "backless" type described in Palmquist Patent No. 2,354,049, issued July 18, 1944, but is unique in the composition of the binder coating, which results in the novel optical characteristics previously described.

Having described various embodiments of the invention, for purposes of illustration rather than limitation, what we claim is as follows:

1. A reflex light reflector sheet having a single layer of small transparent spheres, whose refractive index is approximately 1.9, partially embedded in a binder coating essentially consisting of a transparent body material admixed with a finely divided black pigment and an aluminum flake pigment, the proportion of the black pigment being about 2–5% and the ratio of the aluminum pigment to the black pigment being in the range of about 2:1 to 4:1, by weight.

2. A reflex reflector according to claim 1, wherein said binder coating is coated upon a back reflector having a metallic reflector surface.

KENNETH W. FISHER.
HARRY HELTZER.

REFERENCES CITED

The following references are of record in the file of this patent:

UNITED STATES PATENTS

| Number | Name | Date |
|---|---|---|
| 2,037,773 | Eynon | Apr. 21, 1936 |
| 2,302,305 | Farrell | Nov. 17, 1942 |
| 2,326,634 | Gebhard et al. | Aug. 10, 1943 |
| 2,330,843 | Roddi et al. | Oct. 5, 1943 |
| 2,354,049 | Palmquist | July 18, 1944 |
| 2,379,741 | Palmquist | July 3, 1945 |
| 2,407,680 | Palmquist et al. | Sept. 17, 1946 |
| 2,411,222 | Meigs | Nov. 19, 1946 |